Patented Mar. 23, 1943

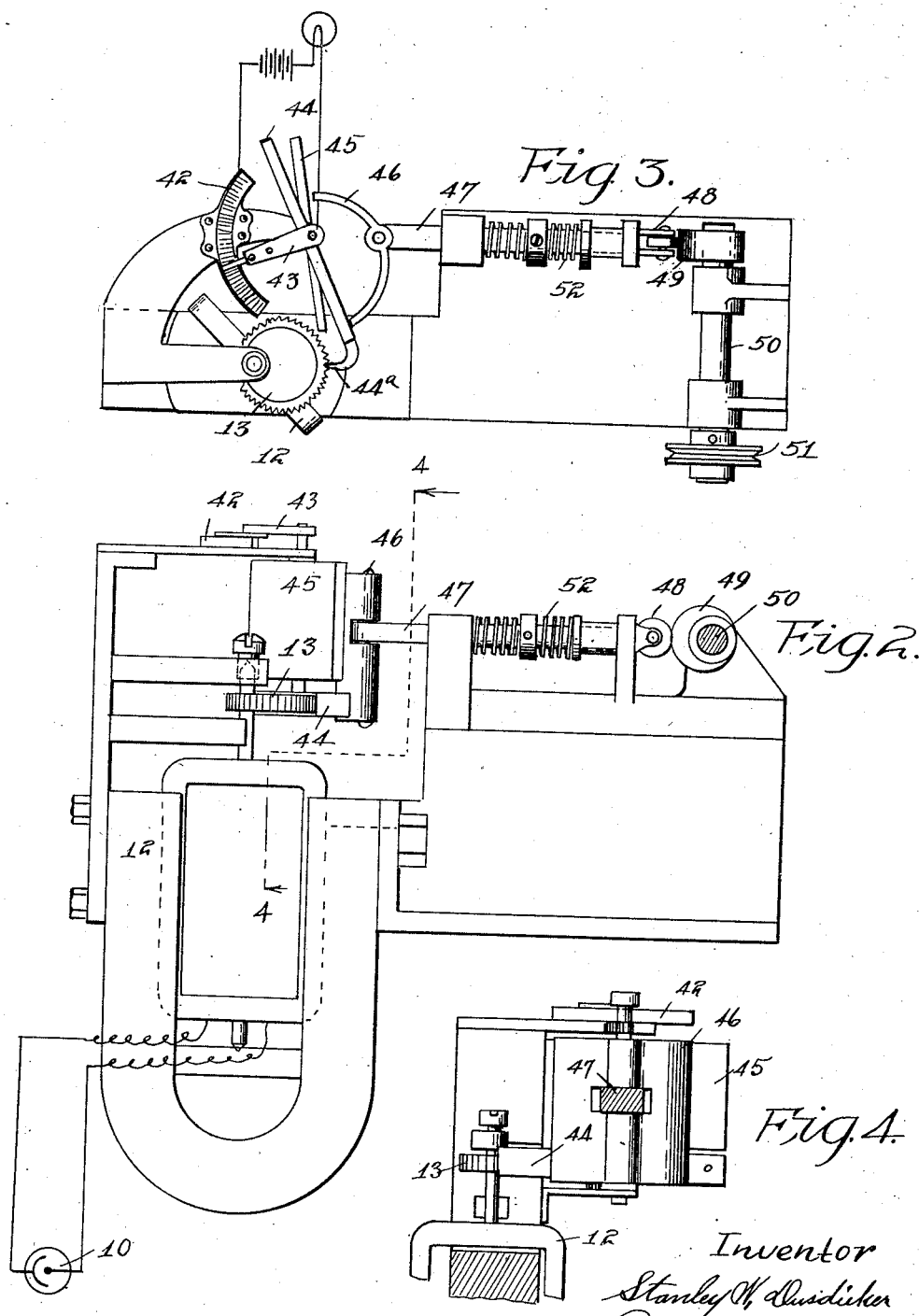

2,314,695

UNITED STATES PATENT OFFICE 2,314,695

LIGHT OPERATED CONTROL SYSTEM FOR ELECTRIC LIGHTS

Stanley W. Dusdieker, Des Moines, Iowa

Application September 16, 1940, Serial No. 356,973

2 Claims. (Cl. 175—375)

In the operation of automobiles after dark it is desirable that when another automobile is approaching the headlights on the automobile being operated be dimmed. Also, in other places, to illustrate, a store room, it is desirable that when sunlight alone does not sufficiently illuminate the room, electric lights be lighted to maintain the desired degree of illumination, and that the brilliancy of said electric lights be at all times proportionate to the amount of sunlight or lack thereof, whereby a uniform degree of lighting may be maintained.

It is well known that a photoelectric cell may be actuated by rays of light to establish a relatively strong electric circuit through it when relatively strong rays of light are applied to the electric cell, and that this electric circuit through the photoelectric cell decreases in proportion as the light rays applied thereto diminish.

The object of my invention is to provide an apparatus of simple, durable and inexpensive construction for utilizing the electric circuit of a photoelectric cell for controlling an electric lighting system, whereby the intensity of the electric lighting system will be automatically increased or diminished at frequent intervals to correspond with the increased or diminished flow of electric current from the photoelectric cell.

More specifically, it is my object to provide an apparatus of this class which, when applied to an automobile headlight circuit, will be automatically actuated to dim the headlights when the headlights of an approaching automobile reach a certain predetermined distance from the automobile thus equipped.

It is well known that the amount of power generated in a photoelectric cell circuit is not sufficient to actuate the ordinary electric switch operating devices, and one of the objects of this invention is to provide a switch operating mechanism operated by power from an extraneous source and which is normally out of contact with any part of the photoelectric cell, so that the circuit of the photoelectric cell is not impeded or interfered with in any manner by said switch, and to provide means of simple and inexpensive construction whereby at regular intervals the electric switch device is automatically moved to position to be actuated by the photoelectric cell and thereby set to increase or diminish the circuit controlled by the switch in proportion to the circuit through the photoelectric cell at the instant of such movement.

In the accompanying drawings—

Figure 2 shows a plan view of my apparatus in which the electric switch is operated periodically by mechanical power;

Figure 3 shows an end view of same; and

Figure 4 shows a detail view in section on the line 4—4 of Figure 3.

Figure 1:
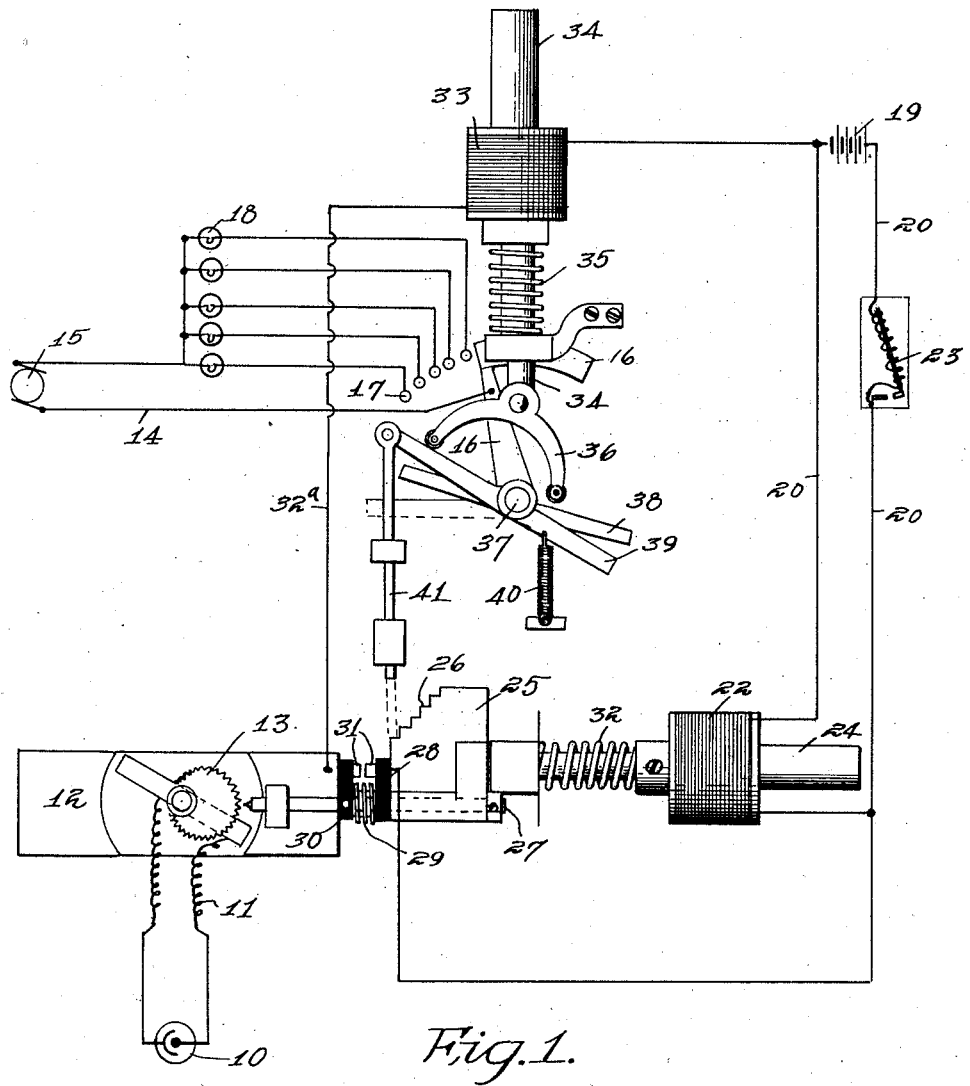
Figure 1 illustrates diagrammatically a form of my invention in which the electric switch is periodically actuated by electric power.

The photoelectric cell which is the actuating agent of the apparatus, is of the usual construction and is indicated generally as 10. Included in the cell circuit 11 is a galvanometer 12 of ordinary construction, and fixed to the galvanometer shaft is a notched disc 13 eccentrically positioned. As the intensity of the rays of light applied to the photoelectric cell increase or diminish, the shaft of the galvanometer is rocked and the position of the notched disc is thereby changed.

The electric circuit to be controlled by the cell 10 is indicated at 14, supplied by a generator 15. Included in this circuit is an electric switch arm 16 for the rheostat 17 controlling a series of electric lamps 18.

The means for operating said switch arm at predetermined regular intervals is as follows: 19 indicates a battery in a circuit 20. In this circuit is included an electromagnet 22 and a flasher 23, of ordinary construction. When the electromagnet 22 is energized, its core 24 is moved longitudinally to the left, as shown in Fig. 1. Fixed to this core 24 is a block 25 having stepped surfaces 26. The stepped block 26 is slidingly mounted on a shaft 27, which shaft is mounted for longitudinal movement in suitable bearings for movement toward and from the notched disc 13. Fixed to the stepped block 26 is an insulator block 28 and fixed to the shaft 27 is an insulator block 30. In each block is a contact point 31 and these blocks are normally held separated by the spring 29 on the shaft 27 and which engages both of said blocks. The core 24 is yieldingly held toward the left, as shown in Fig. 1, by a spring 32 which engages a shoulder on its core 24, and the other end engages a fixed block shown at the left end of the spring 32 in Figure 1. This part of the device operates as follows: As shown in Fig. 1 the eccentric disc 13 is shown in position extended to its maximum position of movement to the right, and when in that position the stepped block 25 will be in the position shown in Figure 1, at the limit of its movement toward the left, because the block 28 is held against further movement to the left by the block 30 on the shaft 27. When, however, the disc 13 moves to its opposite limit the shaft 27 may move further to the left, carrying with it the block 30, thereby permitting the stepped block 25 and the block 28 to move toward the left.

For actuating the electromagnet 22 at regular predetermined intervals there is installed in the circuit 20 the flasher 23 of ordinary construction and which makes and breaks said circuit and moves the block 25 toward and from the galvanometer, and momentarily establishes a circuit through the contacts 31.

Said electric circuit 32a is provided for actuating the switch 16. Included in this circuit are the battery 19 and an electromagnet 33. When this circuit is closed by contact of the contact points 31 with each other, the electromagnet 33 moves its core 34 downwardly against the pressure of the spring 35. Pivoted to this core 34 is a segmental push plate 36. Below the push plate 36 is the shaft 37 of the switch 16, and fixed to this shaft is a switch control plate 38. As the control plate 38 is tilted, the switch arm 16 of the rheostat 17 is moved.

In order to control the amount of movement of the switch arm 16 there is pivoted to the shaft 37 an arm 39, one end of which is yieldingly held down by a spring 40, and pivoted to its other end is a rod 41, so positioned that its lower end will engage one of the steps 26 of the plate 25 when it is moved downwardly. The segmental push plate 36 overlaps this arm 39. When the push plate 36 is moved downwardly it will engage both the push plate 38 and the arm 39, and its downward movement will be limited by the position of the arm 39. In Fig. 1 the dotted lines show the plate 38 and the arm 39 in substantially horizontal positions and the switch arm 16 at the right limit of its movement, and by solid lines the arm 39 is tilted and the switch arm 16 is held in position at the left of its movement.

In practice, let it be assumed that the rays of light impinging upon the photoelectric cell are sufficient to energize the galvanometer to the extent of holding its shaft in the position shown in Fig. 1 with the notched disc also in the position shown. As the rays of light decrease the galvanometer shaft is rotated, and with it the notched disc. No resistance is offered to the movement of the galvanometer shaft, hence, its position at any given time is governed solely by the intensity of the rays of light applied to the photoelectro cell. Normally the circuit in which the flasher 23 is included is open, but when it is closed the electromagnet 22 is energized and its core 24 moved toward the left, as shown in Fig. 1. The amount of this movement is controlled wholly by the position occupied by the notched disc 13 at the time. The second effect of such movement is to close the circuit through the contacts 31, as the stepped plate 25 is moved toward the left, as shown in Fig. 1, as far as permitted by the rod 27 engaging the notched disc 13. When this has been done the circuit 32a is energized and the core 34 of the electric magnet 33 is energized, and this moves the core and its push plate 36 downwardly. The amount of this downward movement is limited by the position of the arm 39, and the position of the arm 39 is controlled by the rod 41 engaging the stepped plate 25. The push plate 36 moves the switch plate 38 and the switch arm 16 as far as is permitted by the arm 39, and this operates the rheostat 17 to control the amount of current delivered to the lights 18. The switch arm 16 remains in the position to which it has been placed, until the next operation of the flasher 23 or until the stepped plate has been moved to another position.

In the modified form of the invention shown in Figs. 2, 3 and 4 there is substituted for the electrically-operated means for controlling the rheostat, a mechanical operating means for the same purpose. In this modified form the photoelectric cell, the galvanometer, the notched disc carried thereby, and the rheostat are all similar in arrangement and operation to the form described. The rheostat is indicated by the numeral 42 and its switch arm as 43. This switch arm is fixed to the switch plate 44 and pivoted to the same shaft as the push bar 45. The curved push plate 46 is positioned to engage both the plate 44 and the bar 45. On one end of the push bar 44 is an arm 44a to engage the notched disc.

The means for reciprocating the plate 46 comprises a slide rod 47 pivoted at one end to the plate 46 and having at its other end a roller 48. This roller engages a cam 49 on a shaft 50 which is provided with a pulley 51 by which it may be belt driven at uniform speed. The rod 47 is yieldingly held in contact with the cam by a spring 52.

In practice with this modified form the push plate 46 is moved at regular intervals to position for forcing the arm 44a against the notched disc, and the same result is attained as with the movement of the rod 27 toward the notched disc.

I claim as my invention:

1. A switch apparatus for automatic electric circuit control, comprising a galvanometer having a movable member, an eccentric operatively connected to the movable member, a shaft slidingly supported for movement toward and from the eccentric, means for periodically and repeatedly moving the shaft toward and from the eccentric, a stepped plate carried by said shaft, a pivotally supported member having a portion thereof guided to position for engaging one of the steps on the stepped plate when moved in one direction, the amount of movement of said pivoted member being determined by the position of the stepped plate, a pivotally supported switch plate adjacent said member, an electric switch operated by a movement of said switch plate, a movable push plate for engaging both said pivoted member and said switch plate, its movement in one direction being limited by the said movable member, and means for periodically and repeatedly moving the push plate toward the metal plate.

2. A switch apparatus for automatic electric circuit control, comprising a movable limiting member, a shaft slidingly mounted for movement toward and from the movable limiting member, the amount of its movement being determined by the position of the movable limiting member, a stepped plate carried by said shaft, a pivotally supported member having a portion thereof guided to position for engaging one of the steps on the stepped plate when moved in one direction, the amount of movement of said pivoted member being determined by the position of the stepped plate, a pivotally supported switch plate adjacent said member, a movable element operated by a movement of said switch plate, a movable push plate for engaging both said pivoted member and said switch plate, its movement in one direction being limited by the said movable member, and means for periodically and repeatedlly moving the push plate toward the switch plate.

STANLEY W. DUSDIEKER.